(12) United States Patent
Agardh et al.

(10) Patent No.: US 8,483,714 B2
(45) Date of Patent: Jul. 9, 2013

(54) METHOD AND APPARATUS FOR IDENTIFICATION OF LOCAL BEACON SYSTEMS

(75) Inventors: Kare Agardh, Rydeback (SE); Magnus Persson, Flyinge (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 35 days.

(21) Appl. No.: 13/203,861

(22) PCT Filed: Oct. 6, 2010

(86) PCT No.: PCT/EP2010/064938
§ 371 (c)(1),
(2), (4) Date: Aug. 30, 2011

(87) PCT Pub. No.: WO2012/045347
PCT Pub. Date: Apr. 12, 2012

(65) Prior Publication Data
US 2012/0264454 A1    Oct. 18, 2012

(51) Int. Cl.
*H04W 4/02* (2009.01)
(52) U.S. Cl.
USPC ............. 455/456.2; 455/456.1; 342/357.21
(58) Field of Classification Search
USPC ...... 455/456.1–3, 456.6, 41.1–2; 340/426.19, 340/539.1, 539.11, 539.13; 342/357.2, 357.21, 342/357.25, 357.31
See application file for complete search history.

(56) References Cited

U.S. PATENT DOCUMENTS

| 2003/0119530 | A1 | 6/2003 | Rankin |
| 2005/0136845 | A1 | 6/2005 | Masuoka et al. |
| 2006/0194587 | A1* | 8/2006 | Sharony et al. ............ 455/456.1 |
| 2007/0021126 | A1 | 1/2007 | Nanda et al. |
| 2007/0258409 | A1 | 11/2007 | Alizadeh-Shabdiz et al. |
| 2010/0069115 | A1* | 3/2010 | Liu ............................. 455/556.1 |
| 2010/0112950 | A1 | 5/2010 | Haartsen et al. |
| 2011/0057836 | A1* | 3/2011 | Ische et al. ............... 342/357.43 |
| 2011/0227790 | A1* | 9/2011 | Li et al. ........................ 342/386 |

FOREIGN PATENT DOCUMENTS

WO    20050093453    10/2005

OTHER PUBLICATIONS

International Search Report, corresponding to PCT/EP2010/064938, date of mailing Jun. 29, 2011.
Written Opinion of the International Searching Authority, corresponding to PCT/EP2010/064938, date of mailing Jun. 29, 2011.

* cited by examiner

*Primary Examiner* — Cong Tran
(74) *Attorney, Agent, or Firm* — Renner, Otto, Boisselle & Sklar, LLP

(57) ABSTRACT

The present invention relates to a method (2) and a mobile device (2) for low power identification of beacon transmitters (20) for determining the position of the mobile device (2) in an indoor environment. The mobile device (2) is first turned into a positioning mode. Thereafter the mobile device (2) receives an identification signal from at least one beacon transmitter (20). This identification signal contains information about that the beacon transmitter (20) may be used for positioning services. Next the mobile device (2) will request the beacon transmitters (20) that are within the range of the mobile device (2) to send data pertaining to their position, and then determine its position by performing calculations based on such data. This will reduce the power consumption of the mobile device (2) substantially.

12 Claims, 2 Drawing Sheets

METHOD AND APPARATUS FOR IDENTIFICATION OF LOCAL BEACON SYSTEMS

TECHNICAL FIELD OF THE INVENTION

The present invention relates to a method and a mobile device for low power identification of local beacon systems used for determining the position of the mobile device. The present invention is especially useful when the mobile device is in an indoor environment.

DESCRIPTION OF RELATED ART

A common feature in today's modern mobile devices is that they are able to determine their geographic position. For outdoor use there are several technologies that may be used in order to determine the position of a wireless communication device such as the mobile device. The use of Global Positioning System (GPS) is one technology that may be used to identify the position of a mobile device all over the world. However, the use of GPS in a mobile device increases the power consumption of the mobile device which is a significant drawback. To overcome this problem Assisted GPS (A-GPS) may be used. A-GPS uses the fact that the mobile device is already connected to land-based network stations in order to incorporate better and more efficient positioning determination in the mobile devices.

However, during time periods when the mobile device is in an indoor environment none of the above technologies is very useful, since a roof often blocks the signals from the satellites. To this end it will be more and more common to place beacon systems in public buildings, such as airports, shopping malls etc. Such beacon system for indoor positioning of mobile devices may be based on a wireless communication system such as Wi-Fi, Bluetooth or ultra-wideband. The same basic problem as for GPS also applies to this indoor solution, i.e. the search of beacons in the indoor environment will increase the power consumption of the mobile device, which is a known tradeoff in order to be able to get its position.

Another problem is that the mobile will not only search for beacons in the indoor environment, but also all other devices having the same wireless communication system, such as Bluetooth. With other words, not only will the device consume excessive power during the search of beacons but also for other devices such as headsets, other mobile devices etc.

Thus there is a need for a method and a device with which the indoor positioning problem can be solved without excessive power consumption.

SUMMARY OF THE INVENTION

Hence, it is an object of the present invention to overcome the above-identified deficiencies related to the prior art and create a mobile device and a method therefore that is able to substantially reduce the power consumption while determining its position.

According to a first aspect of the present invention this object is fulfilled by a method in a mobile device for low power identification of beacon transmitters in a wireless communication network, which are used for determining the position of the mobile device in an indoor environment. In a first step the mobile device is set in a positioning mode, in which it receives an identification signal from at least one beacon transmitter. Thereafter the mobile device requests that the beacon transmitters that are within the range of the mobile device send data pertaining to their position in order to determine the position of the mobile device by performing calculations based on such data.

In another embodiment of the method the identification signal identifies the beacon transmitter as a positioning determining beacon transmitter.

In yet another embodiment of the method the mobile device communicates with the positioning determining beacon transmitter via Bluetooth, which positioning determining beacon transmitter is classified as a unique Class of Device.

In a further embodiment of the method the mobile device communicates with the positioning determining beacon transmitter via Wi-Fi, which positioning determining beacon transmitter is classified as having a positioning service.

In yet another embodiment of the method the calculation is based on range measurements performed by the mobile device.

In another embodiment of the method, the received identification signal comprises identity information about the beacon transmitter that sent the identification signal and the calculation is based on data received by the mobile device from a local or remote database comprising positioning data about the identified beacon transmitter.

According to a second aspect of the present invention this object is fulfilled by a mobile device for low power identification of beacon transmitters in a wireless communication network, which are used for determining the position of said mobile device in an indoor environment. The mobile device is configured to execute the following steps. In a first step the mobile device is set in a positioning mode in which it receives an identification signal from at least one beacon transmitter. Thereafter the mobile device requests the beacon transmitters that are within the range of the mobile device to send data pertaining to their position and then determines its position by performing calculations based on such data.

In another embodiment the mobile device is configured to communicate with the positioning determining beacon transmitter via Bluetooth, said positioning determining beacon transmitter being classified as a unique Class of Device.

In a further embodiment the mobile device is configured to communicate with the positioning determining beacon transmitter via Wi-Fi, said positioning determining beacon transmitter being classified as having a positioning service.

In yet another embodiment the mobile device is configured to perform range measurements on which the calculations are based.

In another embodiment the mobile device is configured to receive the identification signal further comprising identity information about the beacon transmitter that sent the identification signal and that the calculations are based on data received by the mobile device from a local or remote database comprising positioning data about the identified beacon transmitter.

Thus according to the present invention there is a power efficient method for determining the indoor position of a mobile device. There are many situations in which such information about the position is useful. This information may be useful to determine when and where an airport terminal is crowed or at which positions in shopping malls advertisements are best placed.

BRIEF DESCRIPTION OF THE DRAWINGS

The present invention will now be described in more detail in relation to the enclosed drawings, in which.

DETAILED DESCRIPTION OF EMBODIMENTS

In the description of the present invention it will be referred to beacon systems or wireless communication systems which may be used interchangeable and may be systems such as Wi-Fi or a wireless local area network (WLAN), Bluetooth, an ultra-wideband (UWB) or the like. Thus, in context of the present invention the type of wireless communication system used is not of importance, but instead that there is such a system present and that the mobile device is capable of connecting to and exchanging information through such a wireless communication system.

A mobile device according to the present invention will now be described in relation to a cellular telephone, which is a preferred variation of the invention. However, the portable communication device can also be another type of device, like a cordless telephone, a communication module, a PDA or a lap top computer or any other type of portable device communicating with radio waves.

Figure 1:
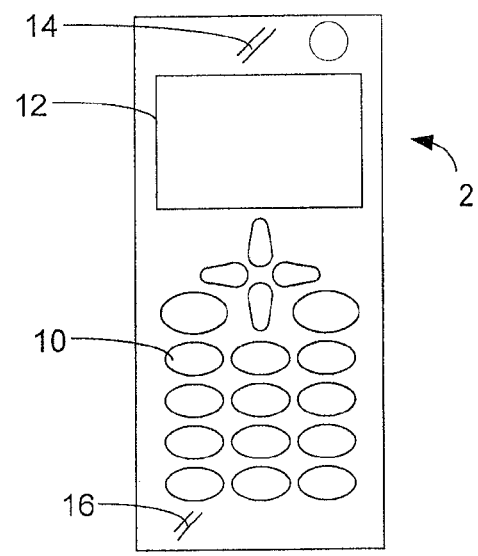
FIG. 1 schematically shows a mobile device according to the present invention.

FIG. 1 schematically shows a front view of a cellular telephone 2 according to an embodiment of the present invention. The telephone 2 includes input/output devices such a number of keys 10 on a keypad provided below a display 12, a loud speaker 14 and a microphone 16. These are all common features for a portable communication device and are well known by a person skilled in the art and are therefore not described in detail. It might be such a cellular telephone that is provided with capabilities to communicate with an indoor beacon system.

Figure 2:
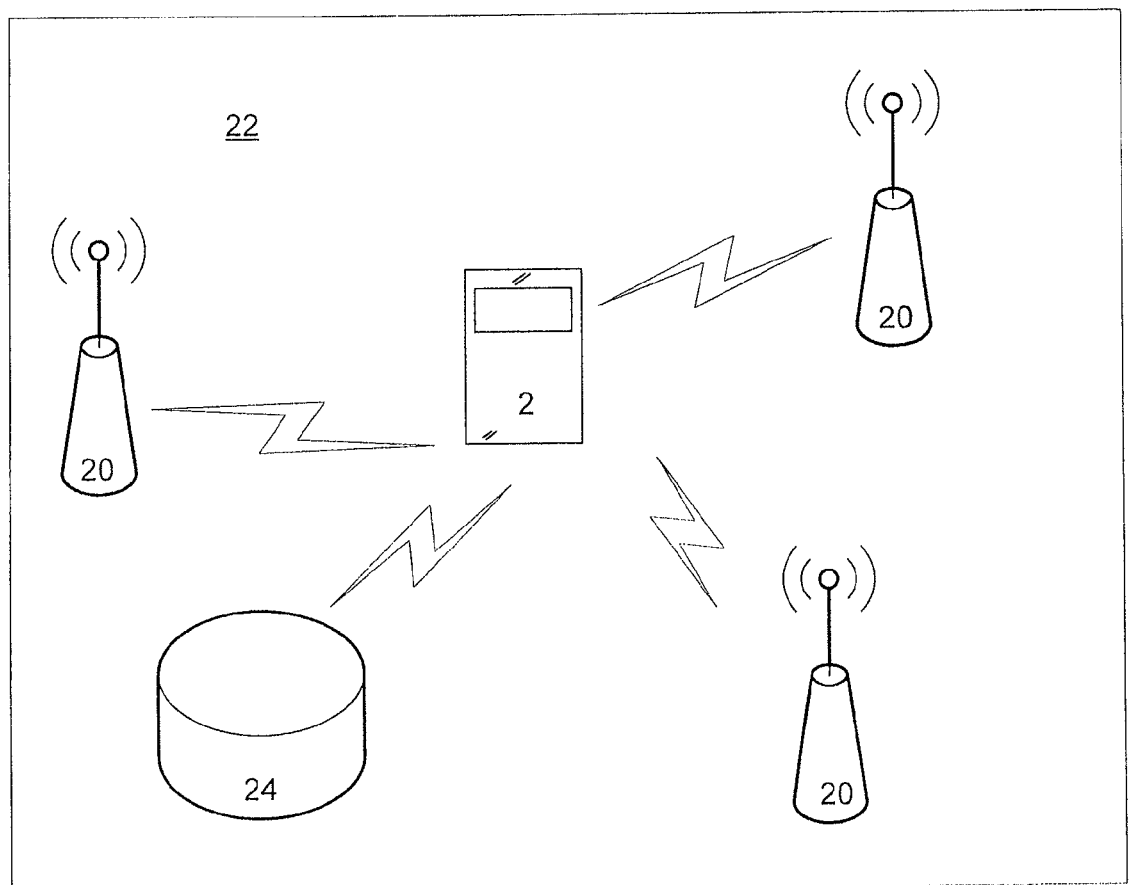
FIG. 2 illustrates an indoor environment, in which the mobile device is searching for and identifying beacons.

In FIG. 2 reference numeral 22 depicts an indoor environment in which the position of the mobile device 2 is to be determined. Even though only one mobile device 2 is shown in FIG. 2 it should be understood that a typical indoor environment contains a large number of mobile devices, but these are not shown in FIG. 2 due to clarity. Such an indoor environment may be an airport, a shopping mall, large department stores etc. According to the present invention such an indoor environment is provided with a beacon system, with which help the position of the mobile device 2 may be determined. In the indoor environment of FIG. 2 three beacon transmitters 20 are shown. However, it should be understood that the number of beacon transmitters will vary depending on the size and layout of the building and also of course depending on the type of wireless communication system used. In the indoor environment of FIG. 2 also a local database 24 with positioning information is depicted. It should be understood that such a database also may be a remote database to which mobile device may connect.

The general inventive concept of the present invention is to reduce the power during the search of beacon transmitters 20 by reducing the search options when the mobile device 2 is set to communicate with the wireless communication system of the beacon transmitters 20. This may be illustrated with the following example. If the mobile device 2 is turned into a positioning mode, for instance by enabling Bluetooth, the mobile device 2 will normally search for all Bluetooth devices in its surrounding. However, by setting the mobile device 2 in a positioning mode, to be described below, it will only search for the beacon transmitters 20. This will of course save power, especially if the indoor environment is full of Bluetooth devices.

Figure 3:
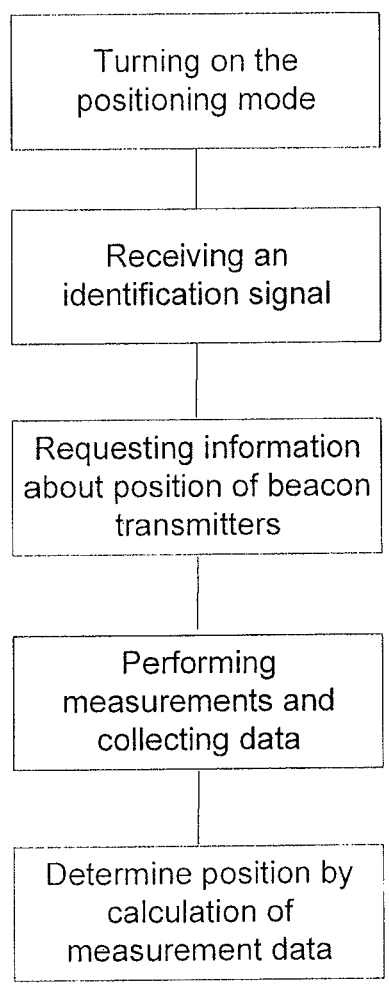
FIG. 3 is a flow chart showing the steps of the method according to the present invention.

To better understand the present invention a method, in the mobile device 2, for low power identification of beacon transmitters will be described in relation to FIG. 3. It should be understood that in order for the method to work the mobile device 2 of the present invention is configured to communicate with the wireless communication system of the beacon transmitters 20, such as Bluetooth, Wi-Fi etc.

Thus according to one embodiment of the present invention the mobile device 2 is set up and configured to be able to only search for beacon transmitters 20, when in a positioning mode. In order to do this selection the mobile device 2 is searching for the identification signal that is sent out by the beacon transmitters 20. The identification signal may vary depending on the wireless communication system used. However, this signal uses low level layers of the OSI (Open Systems Interconnection) model in order to communicate with the mobile device 2, preferably the physical layer.

Two different identifications signal will now be described. Firstly a mobile device 2 that communicates with the beacon transmitters 20 using Bluetooth will be described. According to this embodiment of the present invention a novel non-standard unique Class of Device (CoD) is created for beacon transmitters 20 used for positioning. Thus, in the positioning mode the mobile device 2 may block out all Bluetooth communication except for the identification signal containing the CoD of the beacon transmitters 20. In this context it should be noted that blocking out should be interpreted in a broad sense. It may also be interpreted as prioritizing the CoD that relates to the beacon transmitters 20 in its search and when the beacon transmitters are found the mobile device 2 may continue its search for other devices.

In the second example a Wi-Fi system will generate the identification signal that the mobile device searches for. According to this second embodiment of the present invention a new service will be set up in each Wi-Fi access point. This service will send out an identification signal to the mobile device 2 that classifies the Wi-Fi access point as having positioning as a service. As is evident to a person skilled in the art there may also be other technologies that may be used to send out an identification signal as long as the mobile device 2 is able to use it as a selection criterion when it comes to search for beacon transmitters 20 used for positioning.

For both the above cases the identification signal may comprise other information than that the beacon transmitters 20 may be used for determining the position of the mobile device 2. Thus, in a preferred embodiment of the present the identification signal also comprises information about the identity of the beacon transmitter or transmitters 20 that sent the identification signal. With this information it is possible for the mobile device 2 to communicate with the local or remote database 24 that contains information about the position of the identified beacon transmitters 20.

When the mobile device 2 has received the positioning signal 2 it is ready to start with positioning measurements. These measurements may be done in a number of different ways depending on the wireless communication system. In the simplest case, i.e. when the range of each individual beacon transmitter 20 is a few meters the position of the closet beacon transmitter 20 may be sent to the mobile device 2 as the position thereof directly from that beacon transmitter 20. Thus, in concept of the present invention the meaning of position measurement is to be interpreted broadly and also include the above mention case where the known position of the closest beacon transmitter 20 is transferred from the beacon transmitter 20 to the mobile device 2 and the case where the mobile device 2 collects data pertaining to the beacon transmitters 22 via the local or remote database 24, as described above.

With another wireless communication system the mobile device 2 will request that the beacon transmitters 20 that are within range send data pertaining to their position, i.e. the mobile device 2 will receive data from several beacon transmitters 20. This information will be used in determining the position of the mobile device 2 by letting it calculate the position based on the measurement data collected. There are a lot of different ways to calculate the position based on the collected measurement data, for example to perform triangulation, use fingerprinting etc. As is known to a person skilled in the art triangulation may be performed by using received signal strength indicator (RSSI), time of arrival calculations or the like. It is within the capacity of a skilled person to choose the technology used to perform position calculations. The position calculation may be based on range measurements, collected data from a local or remote database 24 or other measurements, which may be performed by the mobile device 2.

To summarize the above method an example of how the mobile device 2 may be configured will be described. The mobile device 2 is configured to be able to receive identification signals from beacon transmitters 20 in an indoor wireless communication network when it is in a positioning mode. In the positioning mode the mobile device 2 will, as mentioned above, block out other signals sent from the wireless communication network. This will not only facilitate the time it takes to determine the position of the mobile device 2, but also reduce the power required to do so since its search is targeted. When the mobile device 2 has received the positioning signal it will begin to scan for beacon transmitters 20 and collect measurement data. As mentioned above this data may also be obtained through a local or remote database 24. When data about the position of the beacon transmitters 20 is collected the mobile device 2 will calculate its position using the measurement data. Thus compared to a traditional mobile device 2 that performs searches for all devices in the wireless communication network that are within range, the mobile device 2 according to the present invention only performs a directed search towards the beacon transmitters 20 used for positioning.

It should be understood that the foregoing has described principles, preferred embodiments and modes of operation of present invention. However, the invention should not be limited to particular embodiment discussed above, which should be regarded as illustrative rather then restrictive. Thus, as mentioned above the general inventive concept of the present invention is to let the mobile device 2 search only for the beacon transmitters 20 used for positioning and not all other devices within range of the mobile device 2. Thus, the present invention is best defined by the following claims.

The invention claimed is:

1. A method in a mobile device for low power identification of beacon transmitters in a wireless communication network, which are used for determining a position of the mobile device in an indoor environment, comprising the steps of:
   setting the mobile device in a positioning mode,
   searching for identification signals of beacon transmitters in the positioning mode
   receiving an identification signal from at least one beacon transmitter,
   requesting that the beacon transmitters that are within the range of the mobile device send data to the mobile device pertaining to a position of the respective beacon transmitter, and
   determining the position of the mobile device by performing calculations based on the data,
   wherein the identification signal received from the at least one beacon transmitter within the range of the mobile device identifies the at least one beacon transmitter as a positioning determining beacon transmitter for determining the position of the mobile device.

2. A method according to claim 1, wherein the positioning determining beacon transmitter communicates with the mobile device via Bluetooth and is classified as a unique Class of Device.

3. A method according to claim 1, wherein the positioning determining beacon transmitter communicates with the mobile device via Wi-Fi and is classified as having a positioning service.

4. A method according to claim 1, wherein the calculation is based on range measurements performed by the mobile device.

5. A method according to claim 1, wherein the received identification signal comprises identity information about the beacon transmitter that sent the identification signal and that the calculation is based on data received by the mobile device from a local or remote database comprising positioning data about the identified beacon transmitter.

6. A method according to claim 1, wherein when in the positioning mode, the mobile device only searches for identification signals of beacon transmitters.

7. A mobile device for low power identification of beacon transmitters in a wireless communication network, which are used for determining a position of said mobile device in an indoor environment, said mobile device being configured to execute the following steps:
   setting the mobile device in a positioning mode,
   searching for identification signals of beacon transmitters in the positioning mode
   receiving an identification signal from at least one beacon transmitter that identifies the at least one beacon transmitter as a positioning determining beacon transmitter for determining the position of the mobile device,
   requesting the beacon transmitters that are within the range of the mobile device to send data pertaining to a position of the respective beacon transmitter, and
   determining the position of the mobile device by performing calculations based on the data.

8. A mobile device according to claim 7, wherein the mobile device is configured to communicate with the positioning determining beacon transmitter via Bluetooth, said positioning determining beacon transmitter being classified as a unique Class of Device.

9. A mobile device according to claim 7, wherein the mobile device is configured to communicate with the positioning determining beacon transmitter via Wi-Fi, said positioning determining beacon transmitter being classified as having a positioning service.

10. A mobile device according to claim 7, wherein the mobile device is configured to perform range measurements on which the calculations are based.

11. A mobile device according to claim 7, wherein the mobile device is configured to receive the identification signal further comprising identity information about the beacon transmitter that sent the identification signal and that the calculations are based on data received by the mobile device from a local or remote database comprising positioning data about the identified beacon transmitter.

12. A mobile device according to claim 7, wherein when in the positioning mode, the mobile device only searches for identification signals of beacon transmitters.

\* \* \* \* \*